Figure 1:
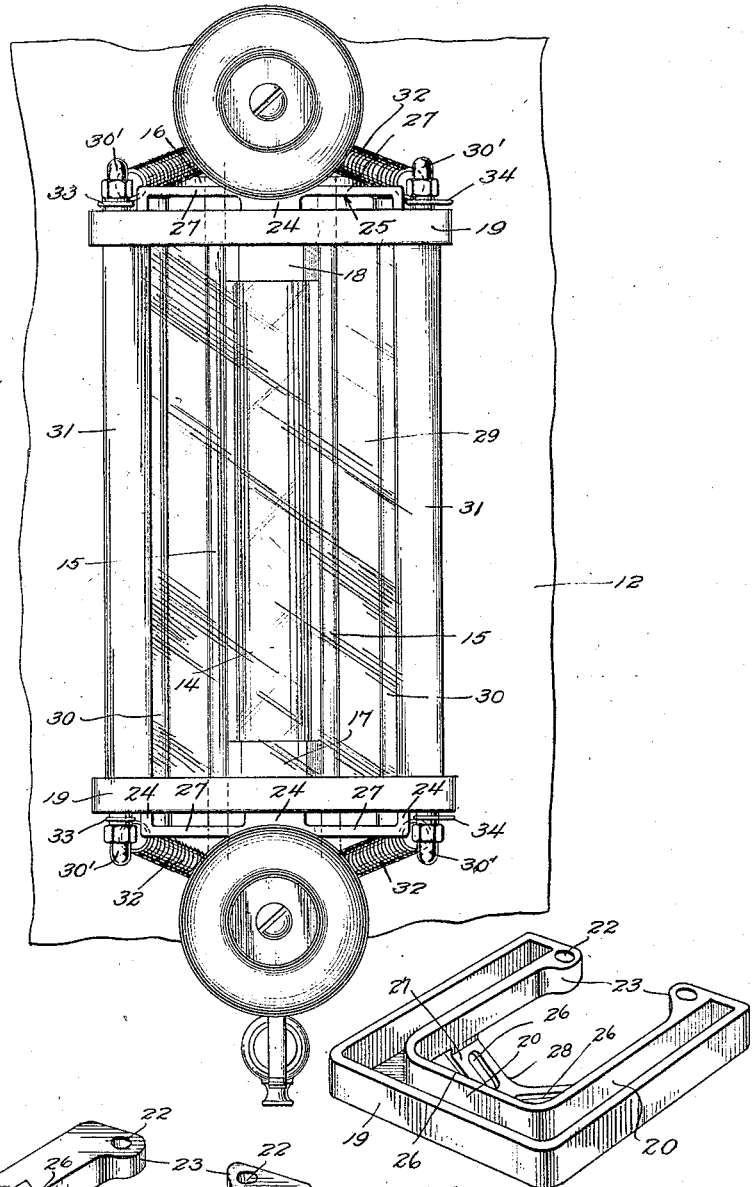

July 8, 1924.

P. B. HUYETTE 1,501,011

GLASS GAUGE PROTECTOR

Filed Jan. 31, 1923

2 Sheets-Sheet 1

Inventor
Paul B. Huyette.
By Frank H. Borden.
his Attorney

July 8, 1924.  1,501,011
P. B. HUYETTE
GLASS GAUGE PROTECTOR
Filed Jan. 31, 1923  2 Sheets-Sheet 2
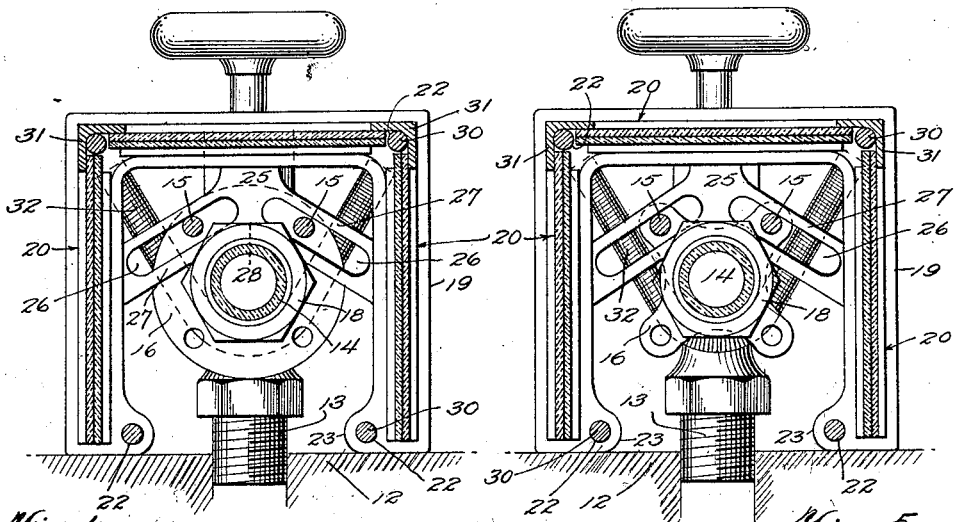
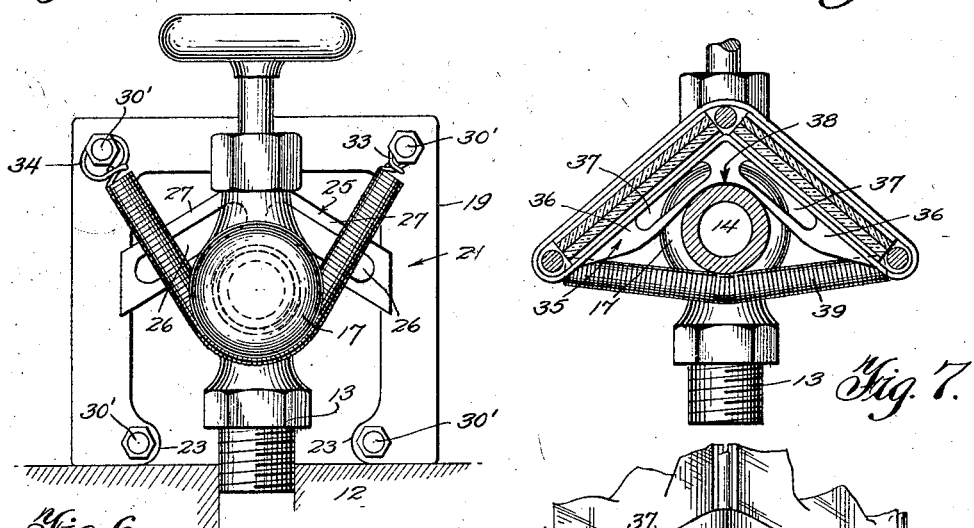
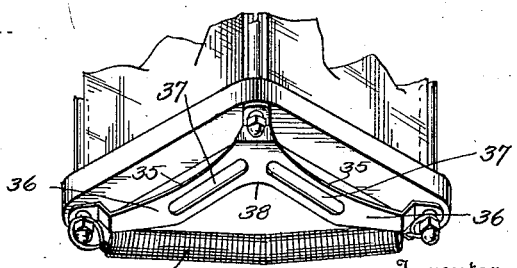
Inventor
Paul B. Huyette
By Frank H. Borden
his Attorney Patented July 8, 1924.

1,501,011

UNITED STATES PATENT OFFICE.

PAUL B. HUYETTE, OF GERMANTOWN, PENNSYLVANIA, ASSIGNOR TO THE PAUL B. HUYETTE CO., INCORPORATED, OF PHILADELPHIA, PENNSYLVANIA, A CORPORATION OF NEW JERSEY.

GLASS-GAUGE PROTECTOR.

Application filed January 31, 1923. Serial No. 616,067.

*To all whom it may concern:*

Be it known that I, PAUL B. HUYETTE, a citizen of the United States, residing at Germantown, in the county of Philadelphia and State of Pennsylvania, have invented certain new and useful Improvements in Glass-Gauge Protectors, of which the following is a specification.

My invention relates to improvements in glass gauge protectors, pertaining particularly to protectors for water gauge glasses capable of application to any standard gauge.

The gauge glasses found in boiler-rooms although usually provided with one or more guard rods extending in parallelism with the glass to protect it from breakage by impact, are not provided with guarding means such as will protect the boiler-room attendant from flying particles in the event that the gauge glass is exploded. Great injury has been occasioned by such explosions, which are generally due either to air drafts, faulty glass, or excess pressure.

It is an object of my invention to provide a protector which shields the attendant from flying particles in the event of breakage of the gauge glass, and which further protects the glass itself from drafts, and yet is of such construction that the gauge glass and the level of the fluid therein may be observed at all times.

It is another object of my invention to provide a protector which can be applied in an operative position to a gauge valve in but little time and as quickly removed for access to the gauge glass. Since gauge valves vary greatly in their construction it is also an object to provide a protector readily applicable to any type or style of gauge valve without modification or change of either boiler, gauge valve or gauge glass.

It is a still further object of my invention to provide a protector which, while mounted directly but removably upon the gauge valves, in no way interferes with the free and proper use of the valves when desired.

Further objects and advantages will become apparent as the description proceeds.

In carrying out my invention, in connection with a gauge comprising a pair of spaced gauge valves and an interposed gauge glass, and guard rods carried by the valves, I provide in its preferred form, a pair of grooved or channeled and drilled cage castings, each having an open side, panes of glass preferably of the non-shatterable variety mounted in the grooves and spacing the castings, cage rods extending between the cage castings and mounted in the drilled openings formed therein, the whole forming an open ended rectangular cage having one open side, each cage casting carrying a recessed or slotted jaw bracket through the slots of which the guard rods are adapted to pass as the primary engaging means, said jaw brackets having each an angular recess or jaw edge on the side toward the open side of the cage adapted to bear against the gauge valve, and a coiled spring carried by each cage casting capable of encircling a gauge valve and cooperating with the jaw edge to form the secondary engaging means. Either or both of the engaging means being capable of use in holding the protector cage in position with respect to the gauge glass.

Figure 2:
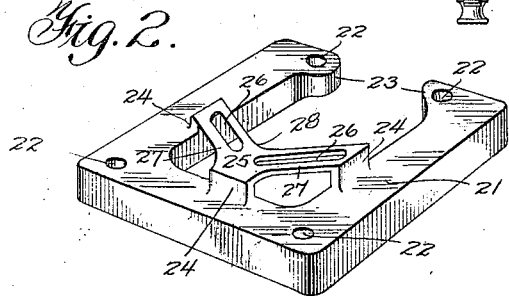
Figure 3:
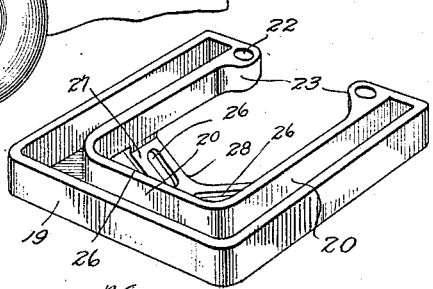

In the accompanying drawings:

Fig. 1 is an elevation of a portion of a boiler with a gauge glass and gauge valves in position thereon, and a protector cage in an operative position on the valves, Fig. 2 is a perspective view of one side of a cage casting, disclosing the slotted jaw bracket, Fig. 3 is a perspective view of the other side of the casting shown in Fig. 2, showing the grooves for receiving the glass, and the drillings for the cage rods, Fig. 4 is a horizontal section through a gauge glass and protector, showing one form of guard rod plate carried by a valve and with the jaw bracket mounted upon the plate and bearing against the valve, Fig. 5 is a similar section with a modified form of guard rod plate, Fig. 6 is a top plan view of a protector in position on a valve and held by the cooperative action of the jaw edge and the resilient coil spring, Fig. 7 is a modified form of protector utilizing a slightly different form of slotted jaw bracket, and Fig. 8 is a perspective view of the lower portion of the protector shown in Fig. 7, The boiler or other fluid containing tank 12 is drilled to receive the valves 13, each valve forming a support in which the gauge glass 14 is mounted. Normally each glass is protected from impact by a guard rod or guard rods 15, carried by the rod guard plates 16 located on each valve. The manner of supporting the guard rods varies with practically every manufacturer, but generally they provide some form of plate such as shown in Fig. 4, or lugs or ears such as are shown in Fig. 5.

The guard rod plate is usually integral with the valve and is interposed between the bowl 17 of the valve and the packing gland 18 in which the glass 14 is held.

The protector cage comprises a pair of similar cage castings 19, preferably forming a three sided support having an open end, and is grooved or channeled as at 20, and on the other is plane or flat, as at 21. Holes or openings 22 are formed or drilled at two of the closed corners, and are also formed in the slightly projecting ears 23 at the ends adjacent the open side.

In a plane parallel to the flat face 21, but spaced therefrom by suitable means such as lugs 24, is the slotted jaw bracket 25. The bracket comprises, in the preferred form, a pair of diverging arms 27, having parallel slots 26 therein, and forming at their front or open end of the casting, the jaw edge or angular recess 28. The spacing between the cage casting and the jaw bracket is a means for saving on the glass used in the protector. Without such spacing the glass of the cage would extend beyond the gauge glass both at top and bottom, wasting several inches of expensive material that would serve no useful purpose. Three panes of glass, preferably of the non-shatterable variety, are mounted in the grooves 20 in each cage casting and the cage thus formed is held as a unit by cage rods 30 passing through openings 22, and locked by nuts 30' screwed to the cage rod ends. If desired angled metal strips 31 may be placed in the corners for reinforcement purposes.

To the nut 30' at one closed corner, I fasten the resilient cable or coiled spring 32, by a constricted loop 33, the free end of the cable terminates in a larger loop 34 engageable removably over the nut at the other closed corner.

The only measurement necessary is the distance between the guard rod plates if there are any, but where there are no plates the vertical length of the gauge glass will suffice. This known, the panes for the protector are cut in accordance with this measurement and the protector assembled. To mount the protector in an operative guarding position, guard rods 15 are removed and the protector cage is moved laterally with the open side toward the boiler, enclosing the gauge glass on three sides and with the jaw brackets of each cage casting passing over the guard rod plates of the valves. The guard rods are then replaced through the plates, and through the registering slots in the brackets as well, holding the protector firmly to the gauge. I have found by a great number of experiments that the form of jaw bracket shown with the slots arranged as indicated is most efficient, and that regardless of the character of guard rod plate, or of the number of rods employed, at least one, and usually two guard rods may be used in the slots to hold the protector in place.

However in the event that a valve is used which has no guard rods, or if it is desired to dispense with their use, the secondary engaging means may be employed.

It will be noted that when the protector cage is properly placed with respect to the gauge, that the jaw edge of each bracket bears against and centers the cage on the valve. The free end of the resilient coiled spring is placed about the valve so that the valve is encircled and the free end is placed over the proper nut 30' and the protector is firmly held against movement. In effect a pair of jaws grips the valve, holding the protector in place.

It will thus be apparent that the jaw bracket 25 serves to support the protector in position either by cooperation with the rods, or by cooperation with the resilient spring or cable, or by both at the same time.

In the modified form shown in Fig. 7, but two panes of glass are used and the protector is in the shape of a wide V. This is quite desirable under certain conditions, although it does not protect the attendant through as wide an angle as the preferred form. In this form the jaw bracket 35 is comprised of two diverging arms 36, slotted at 37, forming the angular recess or jaw edge 38, cooperating with a spring cable or other resilient member 39, to properly space and support the cage.

It is to be noted in connection with either of the forms of protector described, that the jaw bracket might be made integral with the cage casting, or as a separate attachable unit as shown in Fig. 8. The saving effected by casting them integrally is, in a measure, offset by the advantage of being able to interpose spacing means, (not shown) between the cage casting and the engaging element, to vary the distance between them. Such spacing is of value in the case of the unusual vertical length of a valve, and in view of the expense of the glass used in the protector.

I am aware that numerous attempts have been made to provide protectors for gauge glasses, but none with which I am familiar provide any means such as my slotted jaw bracket, whereby the protector may be applied to any type of valve, capable of two distinct fastening functions. Nor am I familiar with any such that are applicable to a valve having guard rods which are also applicable to those having no guard rods. In other words my protector is capable of universal use, which is of particular value in the commercial exploitation of the protectors.

It is obvious that many changes might be made without departing from the spirit of my invention, and I wish it understood that I include all such as may fall within the scope of the appended claims.

I claim as my invention:

1. As an article of manufacture a gauge glass protector adapted for association with a glass gauge having a guard rod, comprising a protector cage and valve engaging means rigidly carried by the cage and having a slot, said slot being so arranged in said means that an edge thereof will contact with a guard rod for holding the cage in position.

2. As an article of manufacture a gauge glass protector adapted for association with a gauge glass extending between gauge valves, comprising a protector cage, valve engaging means carried by the cage having a jaw edge adapted to engage a valve of a gauge and to center the gauge thereon, and a resilient coil carried by the cage capable of engaging such valve at a point diametrically opposite from the point of contact of said jaw edge, for holding the cage in an operative spaced position on such valve.

3. As an article of manufacture a gauge glass protector adapted for association with a glass gauge having a guard rod, comprising a protector cage and attaching means rigidly carried by the cage and having a slot, being so arranged in each attaching means that an edge of said slot will contact with a guard rod for holding the cage in an operative position thereon, said attaching means being formed with a jaw edge adapted to engage a valve of a gauge to center the cage thereon, and resilient means carried by the cage capable of engaging such valve on the opposite side from said jaw edge for secondarily holding the protector in position.

4. As an article of manufacture a gauge glass protector adapted for association with a gauge glass provided with valves and a guard rod, comprising a protector cage having an open side, a jaw bracket rigidly carried thereby and comprising a pair of diverging arms forming a jaw edge toward the open side of the cage adapted to bear against a valve and to center the cage thereon, each jaw bracket having a slot in substantial parallelism with the valve engaging edge of each arm, whereby an edge of said slot will contact with a guard rod for holding the cage in an operative position.

5. The combination with a gauge comprised of a pair of spaced valves and a gauge glass between and a guard rod carried thereby, of a protector cage adapted to be supported by and positioned between the valves, and a jaw bracket at each end of the cage and having a slot, said slot being so arranged in each bracket that an edge thereof will contact with a guard rod for holding the cage in position.

6. As an article of manufacture a gauge glass protector comprising an open sided cage formed of top and bottom cage castings, panes of glass extending between the castings, cage rods holding the cage together and terminating in knobs, a jaw bracket carried by each casting formed of a pair of arms diverging from the closed side toward the open side of said cage, each arm having a parallel slot therein, and forming toward the open side a jaw edge, and a resilient cable or spring one end of which is permanently connected to one of said knobs, and the other end of which is removably connected to another of the knobs, the whole so arranged that when associated with a gauge having guard rods some portion of said slots will register with a guard rod for primarily holding the cage in position on said gauge and if associated with a gauge without rods, or if the rods are eliminated the jaw edge will engage one side of a valve to center the cage, and the resilient spring may be passed about such valve and the free end connected to a knob for secondarily holding the cage.

7. As an article of manufacture a protector adapted for association with a glass gauge having a guard rod extending in parallelism with and spaced from the glass gauge, comprising a protector cage, and means carried by the protector cage engageable by such guard rod for holding the cage in an operative position.

8. As an article of manufacture a protector adapted for association with a glass gauge having a guard rod comprising a protector cage and a rigid bracket carried by said cage engageable by such guard rod for holding the cage in an operative position.

In testimony whereof I affix my signature.

PAUL B. HUYETTE.